_United States Patent_ [19]

Williams

[11] 3,797,480

[45] Mar. 19, 1974

[54] APPARATUS FOR INDICATING THE RATE OF FLUID FLOW

[75] Inventor: Garnet Montague Eveleigh Williams, London, England

[73] Assignee: Ferraris Development & Engineering Company Limited, London, England

[22] Filed: May 28, 1971

[21] Appl. No.: 148,077

[30] Foreign Application Priority Data
May 29, 1970 Great Britain..................... 26140/70

[52] U.S. Cl.................. 128/2.08, 73/194 E, 73/228
[51] Int. Cl............................................. A61b 5/08
[58] Field of Search......... 128/2.08, 2.07; 272/57 R; 73/194 E, 204, 228

[56] References Cited
UNITED STATES PATENTS

| 1,240,797 | 9/1917 | Tatum................................ 73/204 |
| 1,321,546 | 11/1919 | Packard.............................. 73/204 |
| 2,786,354 | 3/1957 | Martin et al......................... 73/204 |
| 3,626,755 | 12/1971 | Rudolph....................... 128/2.08 UX |
| 3,232,288 | 2/1966 | Krobath............................ 128/2.08 |
| 3,645,133 | 2/1972 | Simeth et al................... 128/2.08 X |
| 3,577,984 | 5/1971 | Levy................................ 128/2.08 |
| 3,435,676 | 4/1969 | Bruckner........................ 73/204 X |
| 3,246,515 | 4/1966 | Martino et al...................... 73/204 |
| 1,257,568 | 2/1918 | Wilson............................... 73/204 |
| 1,240,797 | 9/1917 | Tatum................................ 73/204 |
| 2,385,901 | 10/1945 | Williams............................. 73/228 |

OTHER PUBLICATIONS

Journ. of Scientific Instruments, Vol. 32, No. 4, Apr. 1955, pp. 145–147.
Grant, H. P. et al., Fund. of Hot Wire Anemometry, pp. 44–54, rec'd. Feb. 13, 1963.

Primary Examiner—Kyle L. Howell
Attorney, Agent, or Firm—Edwin E. Greigg

[57] ABSTRACT

Apparatus for indicating fluid flow rate which includes a thermistor carried by a mesh and arranged for connection in an electrical circuit including an indicating instrument, the time dependent pattern of variations in the rate of flow of fluid through the mesh being indicated by the indicating instrument because the resistance of the thermistor varies with the fluid flow rate. The thermistor can be calibrated by a comparison of its output signals with the pressure differential across the mesh for one fluid flow rate. The element may be connected into the electrical circuit by leads having the properties of a hot wire anemometer element, the leads being disposed on opposite sides of the mesh and arranged to indicate the direction of fluid flow through the mesh. A peak flow meter having mechanical means for measuring the peak rate of flow of air blown by a human subject, has a thermistor carried by its gauze mesh filter and arranged to give an indication of the time dependent pattern of variations in the rate of flow of air blown by the subject.

8 Claims, 3 Drawing Figures

PATENTED MAR 19 1974  3,797,480

INVENTOR
Garnet M. E. Williams
BY Edwin E. Greigg
ATTORNEY

APPARATUS FOR INDICATING THE RATE OF FLUID FLOW

BACKGROUND OF THE INVENTION

This invention relates to apparatus for indicating the rate of flow of a fluid and more particularly, although not exclusively to a peak flow meter for determining the maximum flow of air which a person can produce when exhaling air.

The peak flow meter is of the kind comprising a casing carrying a mouthpiece and defining a chamber, a movable member extending transversely of the chamber and serving as, or carrying an indicator movable relative to scale markings on the casing, resilient means acting upon the movable member to oppose movement of the movable member away from the mouthpiece, and a slot extending through the casing into the chamber. Such a meter might be a Wright peak flow meter known to those skilled in the art. The arrangement is such that air blown into the mouthpiece by a person acts upon the movable member to urge it away from the mouthpiece against the action of the resilient means, such movement of the movable member away from the mouthpiece exposing a part of the slot and placing that part in communication with the mouthpiece thus increasing the length of the slot portion which opens into that part of the chamber between the mouthpiece and the movable member and through which air blown into the chamber can escape. Such a peak flow meter shall be referred to hereinafter as a peak flow meter of the kind described.

OBJECTS AND SUMMARY OF THE INVENTION

Apparatus for indicating the rate of flow of a fluid can include a heat sensitive electrical resistance element, such as a thermistor, for positioning within the flow of fluid to be measured, the heat sensitive resistance element being arranged for connection within an electrical circuit including an electrical signal indicating device. An electrical signal generated within the electrical circuit and indicated by the indicating device gives an instantaneous indication of the rate of flow of fluid past the element because it is dependent upon the resistance of the element which varies with the rate of flow of fluid past the element. It is necessary to establish the relationship between the resistance of the element and the rate of flow of fluid flowing past the element before an electrical signal generated within an electrical circuit including the element can be employed to indicate an actual value of fluid flow rate.

It is, therefore, an object of this invention to provide apparatus for indicating the rate of flow of a fluid including a heat sensitive electrical resistance element for positioning within the fluid flow, and means by which the element can be readily calibrated to establish the relationship between the resistance of the element and the rate of flow of fluid at any one time.

According to one aspect of this invention there is provided apparatus for indicating the rate of flow of a fluid through a duct, including means defining a flow restricting orifice withing the duct and carrying a heat sensitive electrical resistance element, the element being connected between terminals arranged for connection into an electrical circuit in which an indicating signal is to be generated, the apparatus being arranged so that, during use, the flow of fluid to be indicated flows past the element and through the orifice, the electrical resistance of the element being dependent upon the rate of flow of fluid through the orifice.

According to another aspect of this invention there is provided apparatus for indicating the rate of flow of a fluid through a duct, including a mesh mounted within the duct so as to define a plurality of flow restricting orifices and carrying a heat sensitive electrical resistance element, the element being connected between terminals arranged for connection into an electrical circuit in which an indicating signal is to be generated. The apparatus is arranged so that, during use, the flow of fluid to be indicated flows past the element and through the orifices of the mesh, the electrical resistance of the element being dependent upon the rate of flow of fluid through the orifices of the mesh.

Preferably the heat sensitive electrical resistance element is a thermistor. The thermistor may be positioned within the central orifice of the mesh, or may be positioned within an orifice spaced radially from the center of the mesh. The electrically conducting leads by which the thermistor is connected to the terminals may be threaded through the mesh. As an alternative to being threaded through the mesh, the leads may be formed of a material such as, a tungsten alloy or a platinum alloy, having the properties of a hot wire anemometer element and arranged to extend on opposite sides of the mesh so that each lead is shielded from the effect of fluid flow from the opposite side of the mesh. The arrangement is such that, a comparison of the electrical output of each of the two leads can be employed to indicate the direction of flow of fluid through the mesh.

It is another object of this invention to provide a peak flow meter which, in addition to providing a measured reading of the peak rate of flow of air blown by a human subject, can be used to given an indication of the appearance of the time dependent pattern of the changing rate of flow of air blown by the human subject, particularly an indication of time dependent pattern of air flow blown by the human subject after the occurrence of the peak rate of flow.

According to a feature of this invention there is provided a ventilatory instrument for measuring the peak rate of flow of air blown by a human subject, incorporating apparatus according to the foregoing aspect of this invention, wherein the flow of fluid to be indicated by the apparatus comprises the flow of air blown by the human subject.

According to yet another aspect of this invention, there is provided a peak flow meter of the kind described, including sensing means responsive to the rate of flow of air blown into the mouthpiece by the human subject and arranged to produce a signal which varies with changes in the rate of flow of air blown into the mouthpiece, the peak rate of flow of air blown into the mouthpiece by the human subject being indicated by the position of the indicator relative to the casing.

Preferably the sensing means comprises a heat sensitive electrical resistance element mounted within the mouthpiece and connected electrically between terminals arranged for connection into an electrical circuit in which an indicating signal is to be generated. The arrangement is such that air blown into the mouthpiece by a human subject flows past the element, the electrical resistance of the element being dependent upon the rate of flow of air blown into the mouthpiece.

Conveniently the heat sensitive electrical resistance element comprises a thermistor carried by a gauze mesh filter mounted within the mouthpiece to prevent mucus being blown into the meter by a human subject. The mouthpiece may be separable from that part of the casing which defines the chamber.

BRIEF DESCRIPTION OF THE DRAWING

Two embodiments of this invention will now be described, by way of example only, with reference to the accompanying drawings, of which.

DESCRIPTION OF THE PREFERRED EMBODIMENTS

Figure 1:
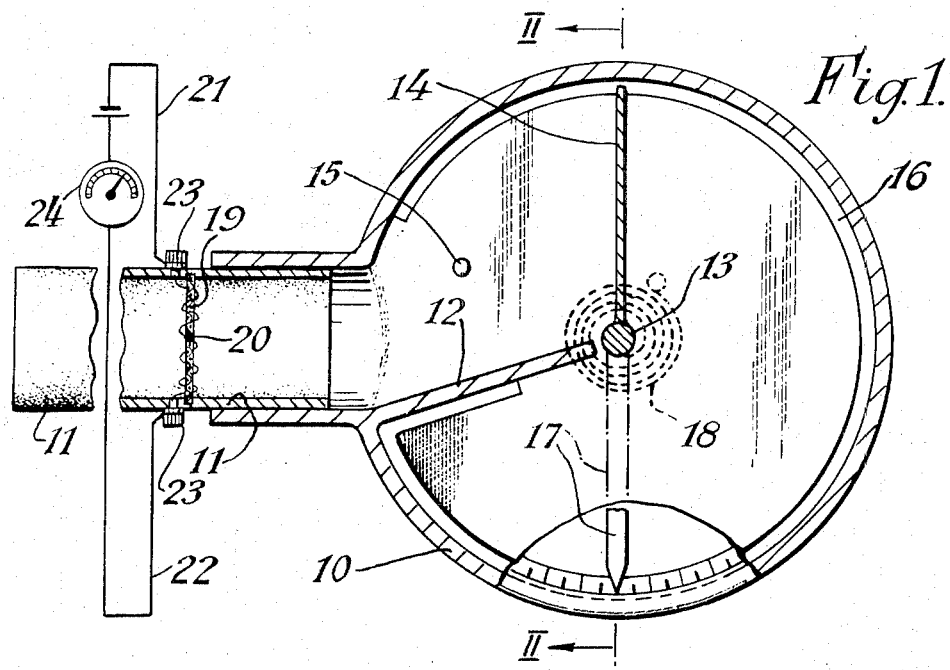
FIG. 1 is a plan view in cross section of a Wright Peak Flow Meter incorporating one embodiment of the invention taken along the line I — I of FIG. 2.
Figure 2:
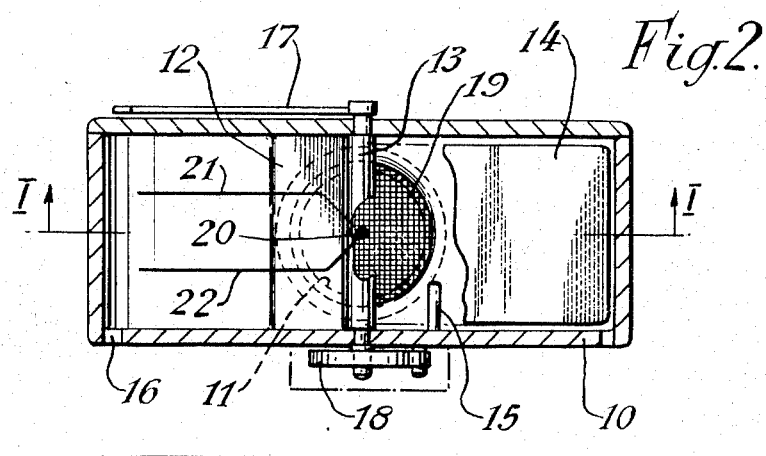
FIG. 2 is a view in cross section taken along the line II — II of FIG. 1.

Referring to FIGS. 1 and 2 of the drawings, the Wright Peak Flow Meter comprises a casing 10 defining a cylindrical chamber and an integral tube which extends radially from an aperture in the cylindrical wall of the cylindrical chamber. A tubular cardboard mouthpiece 11 is inserted at one end into the tubular part of the casing 10 so as to extend radially from the cylindrical chamber. A radial wall 12 extends inwardly from a point on the cylindrical outer wall of the casing 10 near to the periphery of the aperture and terminates near to the center of the cylindrical casing 10. An axle 13 is mounted within the clyindrical casing 10 for rotation about the axis of the casing 10. A vane 14 is carried by the axle 13 and extends radially therefrom.

A peg 15 (see FIG. 1) extends axially from one radial face of the cylindrical casing 10 within the cylindrical chamber and serves as a stop preventing the vane 14 from being positioned with its radially outer edge between the axle 13 and the aperture in the cylindrical wall. A circumferential slot 16 formed in the radially outermost portion of one of the two radial faces of the cylindrical casing 10 extends circumferentially from one of its ends, which is on the side of the radial wall 12 remote from the mouthpiece 11, through more than three quarters of the total circumference of the cylindrical casing 10. The circumferential slot 16 terminates at its other end near to and just short of the mouthpiece 11. The axle 13 carries an indicating arm 17 at one of its ends outside the cylindrical casing 10. The indicating arm 17 extends radially from the axle 13 and is arranged to pass over scale markings on the surface of the corresponding radial face of the cylindrical casing 10. The other end of the axle 13 is secured to a torsion spring 18 outside the cylindrical casing 10. The end of the torsion spring 18 remote from the axle 13 is anchored to the cylindrical casing 10. The torsion spring 18 acts upon the axle 13 to urge the vane 14 into engagement with the axially extending stop afforded by the peg 15 within the casing 10.

The dimensions of the vane 14 are such that a small clearance is defined between its three edges not secured to the axle 13 and the internal surface of the walls of the casing 10.

A releasable one-way brake (not shown) is provided which holds the vane 14 and the indicating arm 17 at, or near to the postion of maximum deflection from the peg 15. A release mechanism (not shown) e.g. a manually operable button, is provided to release the one way brake and allow the vane 14 to return to engage the peg 15 under the influence of the torsion spring 18.

A wire or plastic gauze mesh 19 is mounted within the mouthpiece 11 so as to extend transversely thereof. A thermistor 20, preferably less than 0.5 mm in diameter, is mounted at the center of the central orifice of the wire of plastic gauze mesh 19. Two leads 21 and 22 extend from the termistor 20 to terminals 23 on the outer surface of the mouthpiece tube. The leads 21 and 22 may be threaded through the wire or plastic gauze mesh 19.

In using the instrument, the terminals 23 are connected into an electrical indicating circuit including a battery, or other source of electric current, and an indicating instrument 24, such as a galvanometer recorder or an oscilloscope. A person blows repeatedly into the meter through the mouthpiece 11.

The provision of the wire gauze mesh 19 prevents the ingress of large particles of mucus etc. into the interior of the cylindrical casing 10.

The flow of air blown into the mouthpiece 11 passes, and thus cools the termistor 20. The electrical resistance of the thermistor 20, which is dependent upon the temperature of the thermistor 20, is related to the rate of flow of fluid past the thermistor 20. The indicating instrument 24 indicates an electrical signal developed within the electrical circuit including the thermistor 20. The magnitude of the electrical signal developed varies with changes in the electrical resistance of the thermistor 20 and thus varies with changes in the rate of flow of air past the thermistor 20 as air is blown repeatedly into the mouthpiece 11 by the person. Thus the indicating instrument 25 indicates the time dependent pattern of the rate of flow of air blown into the mouthpiece 11 on each occasion.

Air blown into the mouthpiece 11 passes through the wire of plastic gauze mesh 19 into the interior of the cylindrical casing 10 and acts upon the vane 14. The dimensions of the thermistor 20 are such that it does not interfere significantly with the flow of air into the casing 10. A proportion of the air leaks past the vane 14 through the space between the three edges of the vane 14 and the corresponding interior walls of the cylindrical casing 10. A major part of the air blown into the interior of the cylindrical casing 10 acts upon the vane 14 to rotate the vane 14 within the casing 10 against the action of the torsion spring 18. As the vane 14 rotates against the action of the torsion spring 18, a portion of the circumferential slot 16 is exposed and air blown into the interior of the casing 10 escapes through that portion of the slot 16 so exposed. When the area of slot 16 exposed is such that the impulse energy of air blown into the meter equals the energy of the air escaping through the slot 16 together with energy dissipated otherwise into the meter which includes kinetic energy attained by the movable parts of the meter, energy stored in the torsion spring 18 and work done in overcoming friction, the vane 14 is held stationary and the position of the indicating arm 17 indicates the measure of the maximum or peak rate of flow of air blown into the casing 10 in the course of measurement. This position of the indicating arm 17 is a measure of the peak rate of flow of air blown into the meter by the person. The releasable one-way brake (not shown) ensures that the indicating arm 17 is held in this position which is interpreted as the greatest rate of flow of air blown into the instrument by the person.

The appearance of the time dependent pattern of the changing rate of flow of air blown into the meter as indicated by the indicating device 24 of the electrical circuit, particularly the appearance of the pattern of air blown after the occurrence of the peak flow, increases the worth to the clinician of the knowledge of the value of peak rate of flow of air blown into the meter. This is because the pattern is dependent upon the clinical condition of the subject.

When it is desired to calibrate rate of flow readings derived from the thermistor 20, the mouthpiece 11 may be separated from the casing 10 and air may be caused to flow steadily through the duct defined by the mouthpiece 11 and thus through the mesh 19, electrical readings dependent upon the electrical resistance of the thermistor 20 may be taken and the pressure of air flow through the mesh 19 may be measured at each end of the duct i.e. upstream and downstream of the mesh 19. Such pressure measurements may be made by use of water filled U-Tube manometer. The square root of the difference in pressure across the mesh 19 may be employed, together with the dimensions of the mesh 19, to calculate the rate of flow of fluid through the center of the mesh 19 at any one time and this calculated figure may be used to establish the relationship between the electrical resistance of the thermistor 20 and the rate of flow of fluid through the mesh 19 past the thermistor 20.

The relationship between rate of flow and difference of pressure across the mesh 19 is well known to be constant, and for a specified mesh 19 may be predetermined experimentally and subsequently used in lieu of calculated values of the relationship.

As with known Wright Peak Flow Meters, the mouthpiece 11 may be thrown away after use to investigate the ventilatory characteristics of a human subject, the discarded mouthpiece being replaced by a new mouthpiece for the next use of the instrument. It will be understood that mouthpieces 11 as described above can be used in combination with existing Wright Peak Flow Meters. As an alternative, the mesh 19 and the terminals 23 may be mounted within the tubular part of the casing 10 which may be separable from the remainder of the casing if desired.

Apparatus for indicating the rate of flow of a fluid in accordance with this invention is not restricted to use in combination with a peak flow measuring instrument.

Figure 3:
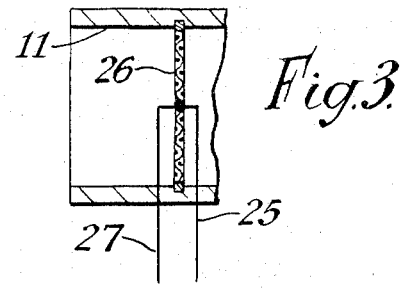
FIG. 3 illustrates diagrammatically apparatus according to a second embodiment of this invention.

In other applications of apparatus in accordance with this invention, the leads between the thermistor and its terminals may be arranged so that, as is illustrated in FIG. 3, one lead 25 extends on one side of the mesh 26 and the other lead 27 extends on the opposite side of the mesh 26. The leads 25 and 27 are formed of a material having the properties of a hot wire anemometer element, for example a tungsten alloy or platinum alloy, and are of a small diameter, such as 0.025 mm. In such an arrangement one of the leads will be protected from the flow of fluid through the mesh by the material of the mesh, whilst the other is exposed fully to the flow of fluid through the mesh and vice versa for fluid flow through the mesh in the opposite direction. Lengths of the two leads may be connected within an auxiliary electrical circuit so that the electrical resistance of the two lengths so connected may be compared to give an indication of the direction of flow of fluid through the wire mesh.

The thermistor may be mounted in one of the orifices of the mesh spaced radially from the central orifice and arranged to give an indication of the rate of flow of fluid through the mesh at the point spaced radially from the center of the mesh. It will be understood that any other suitable form of heat sensitive electrical resistance element may be employed in place of the thermistor described.

In practice it is desirable usually to provide a second heat sensitive electrical resistance element which is arranged to produce an electrical signal which can be used as an enviromental temperature reference and thus aids processing of the signal produced by the heat sensitive electrical resistance element of apparatus according to this invention. Use of such a second heat sensitive electrical resistance element is well known and has not been described in edtails herein.

I claim:

1. Apparatus for indicating the rate of flow of fluid through a duct, comprising in combination: a duct; a mesh member mounted within the duct so as to define a plurality of flow restricting orifices; a heat sensitive electrical resistance element being carried by said mesh member; an indicating element; a voltage source; and means connecting said electrical resistance element, said indicating element and said voltage source together to form an electrical circuit in which an indicating signal is to be generated, the apparatus being arranged so that, during use, the flow of fluid to be indicated flows past said electrical resistance element and through the orifices of said mesh member, the electrical resistance of said element being dependent upon the rate of flow of fluid through the orifice of said mesh member.

2. Apparatus for indicating the rate of flow of a fluid through a duct as claimed in claim 1, wherein said heat sensitive electrical resistance element is a thermistor.

3. Apparatus for indicating the rate of flow of a fluid through a duct as claimed in claim 2, wherein said thermistor is positioned within one of the orifices of said mesh member.

4. Apparatus for indicating the rate of flow of a fluid through a duct as claimed in claim 3, wherein said mesh member has a central orifice, and wherein said thermistor is positioned within the central orifice of said mesh member.

5. Apparatus for indicating the rate of flow of fluid as claimed in claim 2, wherein said connecting means includes electrical terminals to which said indicating element and said voltage source are connected, and electrical conducting leads extending from said thermistor, said electrical conducting means connecting said thermistor to said terminals, said electrical conducting leads being threaded through said mesh member.

6. A peak flow meter comprising in combination: a casing defining a chamber and having scale markings thereon; a movable member mounted to said casing and serving as an indicator movable relative to said scale markings; a mouthpiece mounted to said casing through which a human subject blows air into said chamber; a gauze mesh filter mounted within said mouthpiece to prevent mucus being blown into said casing by a human subject; means acting on said movable member to oppose movement thereof away from said mouthpiece; said casing having a slot extending therethrough and into said chamber through which air passes out of said chamber; the rate of flow of air blown into said mouthpiece being indicated by the position of said movable member relative to said scale; and sensing means responsive to the rate of flow of air blown into said mouthpiece and arranged to produce a signal which varies with changes in the rate of flow of air blown into said mouthpiece, said sensing means comprising: a heat sensitive electrical resistance element carried by said gauze mesh filter; an indicating element; a voltage source; and means connecting said electrical resistance element, said indicating element and said voltage source together into an electrical circuit in which an indicating signal is to be generated, the arrangement being such that air blown into said mouthpiece by a human subject slows past said element, the electrical resistance of said element being dependent upon the rate of air blown into said mouthpiece.

7. A peak flow meter as claimed in claim 6, wherein said mouthpiece is separable from that part of the casing which defines said chamber.

8. In a peak flow meter as claimed in claim 6, wherein said electrical resistance element comprises a thermistor.

* * * * *